United States Patent [19]

Iida

[11] Patent Number: 4,780,798

[45] Date of Patent: Oct. 25, 1988

[54] LIGHT TRANSMISSION FIBRE ILLUMINATING DEVICE

[75] Inventor: Yoshiko Iida, Tokyo, Japan

[73] Assignees: Yumi Saki; Yang Jeong Haw, both of Kyoto, Japan

[21] Appl. No.: 849,267

[22] Filed: Apr. 8, 1986

[30] Foreign Application Priority Data

Mar. 7, 1986 [KR] Rep. of Korea .................. 86-1611

[51] Int. Cl.[4] .............................. F21V 7/04
[52] U.S. Cl. .................. 362/32; 362/331; 362/806
[58] Field of Search ............. 362/32, 806, 26, 27, 362/104, 121, 318, 331; 350/431, 321

[56] References Cited

U.S. PATENT DOCUMENTS 1,351,562  8/1920  Foster ............................ 362/32
3,439,157  4/1969  Myles ............................ 362/32

FOREIGN PATENT DOCUMENTS 120002  9/1980  Japan ............................ 350/321
86801   5/1982  Japan ............................ 350/431
815014  3/1981  U.S.S.R. ........................ 362/318

OTHER PUBLICATIONS

Myer, PCT WO85/03781, Aug. 29, 1985.
Opto-Vac Inc. handbook, "Optical Crystals", 1982.

Primary Examiner—Samuel Scott
Assistant Examiner—Noah Kamen
Attorney, Agent, or Firm—Price, Gess & Ubell

[57] ABSTRACT

A light transmission fiber illuminating device having a transparent body is provided with an opening containing inorganic particles with an illuminated or a silicated property coated with oil. A transparent cap covers up the opening of the transparent body.

18 Claims, 2 Drawing Sheets

LIGHT TRANSMISSION FIBRE ILLUMINATING DEVICE

BACKGROUND OF THE INVENTION

Field of the Invention

A light transmission fiber is capable of transmitting light from one end along the fiber to another end, and no matter how bent the fiber is, one can see the transmitted light of the lite-up end from the nonlite-up end. It is also capable of making use of a multiple light transmission fiber to transmit light from the light source along various routes (different light transmission fibers) to different positions. This kind of technique is being used in computer indicators.

There can be installed a color transparent plate that can transform light from a light source into light of different colors which are then transmitted by different light transmission fibers to fixed positions. This kind of design can often be seen as a decoration for a Christmas tree. However, a user of the above device that wishes to use the light transmission fiber front end as the illuminating surface incurs the problem that the illuminating area is too small and the angle is too small so that one cannot concurrently see the illuminated light from different positions relative to the light transmission further front end, one can ony see light illuminated directly at the light transmission front end.

SUMMARY OF THE INVENTION

The present invention can make use of a light transmission fiber with an improved illuminating member to transmit a relatively weaker light in a small area to a larger area. It can enlarge the illuminating area and increase brightness of the fiber end, which is advantageous for various decoration and computer indication usage.

DETAILED DESCRIPTION OF THE PREFERRED EMBODIMENTS

Figure 2:
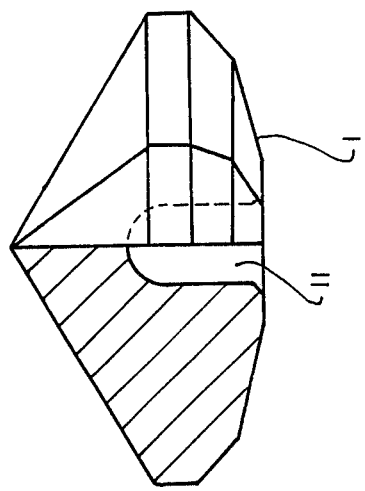
FIG. 2 is a partial side cross-sectional view of FIG. 1.
Figure 1:
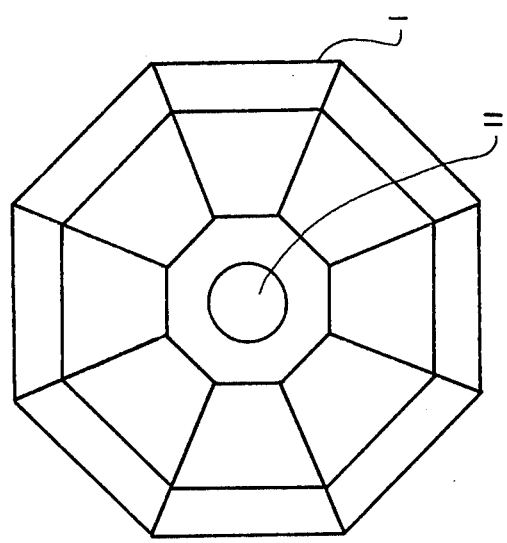
FIG. 1 is a bottom view of an illuminating device.

With reference to FIG. 1, the bottom surface of a transparent housing or body 1 is disclosed with a central opening or interior cavity 11. While there is no specific limitation to the shape of the transparent body 1, the preferred embodiment is shown with a polygonal shape and multiple facets. FIG. 2 discloses a partial cross-sectional view of a polygonal shape having a central cavity.

Figure 3:
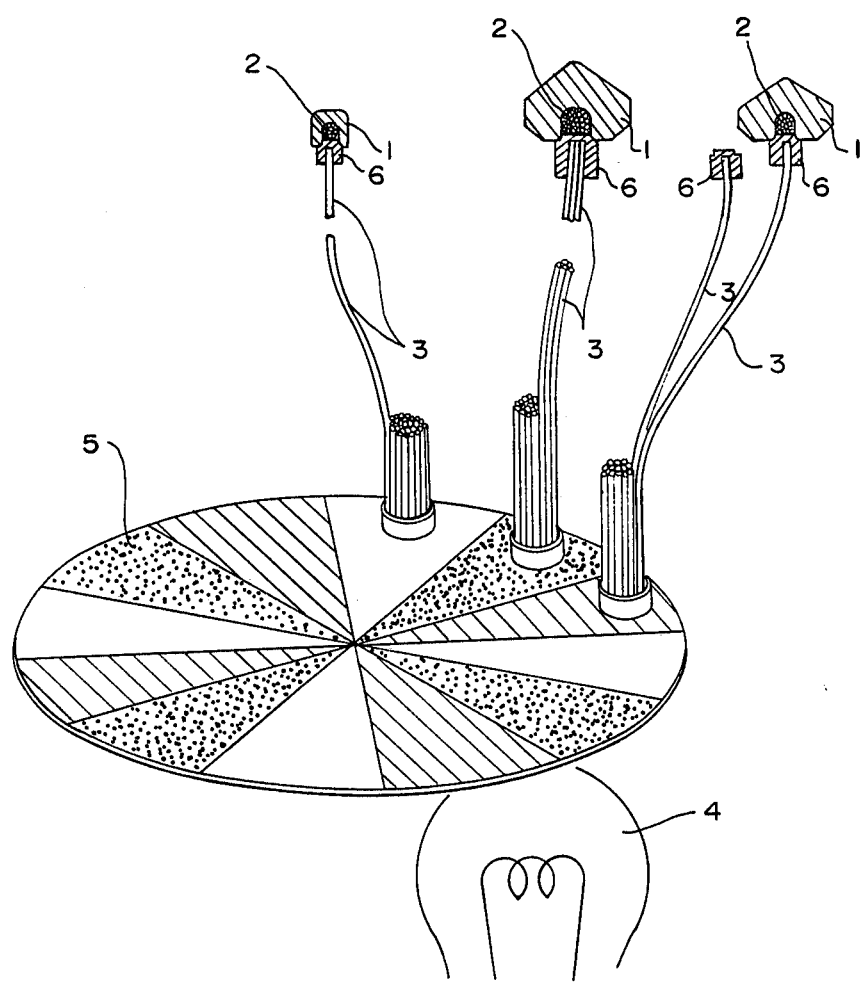
FIG. 3 is a perspective view of one embodiment of the present invention with partial cross-sectional components.

As can be seen in FIG. 3, the central cavity or opening 11 of the transparent body can be filled in with particles that can provide an illumination feature such as silicate inorganic particles. Oil can also be provided on the surfaces of the inorganic particles 2 positioned in the opening 11. A transmission fiber 3 can be fixed by a transparent cap 6 to fit into the opening 11 of the transparent body 1. A light source 4 can project light rays through a light transmission plate 5 that can be partitioned to show various colors generated by the light source 4 through the partitions and transported along different light transmission fibers to contact through appropriate openings 11 illuminating devices 1.

An illuminating device of a large illuminating area with a wide angle can be formed as a result of the absorption of light into the illuminating device and contact with the inorganic particles or silicated oil that can be provided in the opening 11. For the choice of either the illuminated particles by themselves or in combination with silicated oil, fluoride calcium, fluorinated barium or sulphuric zinc optical particles are the preferred choice. Numerous types of oil and the proportion of the amount of oil and fluorinated calcium that can be utilized within a opening 11 can be chosen. The transparent cap 6 which is attached to the end of the light transmission fiber can be fixed to one or more fibers as shown in FIG. 3.

The inventor has tried to utilize light spreading materials such as glass powder in the opening 11 of the transparent body 1 with a light transmission fiber 3 having a fixed cap 6 positioned to cover the opening 11 as the illuminating device. While this arrangement can split the transmitted light from the light transmission fiber 3, the resulting observation of the light emitted from the transparent body 1 shows that the light emitted is relatively weak and that the border of the opening 11 will create a black line (incapable of reflecting light). It is believed that this is due to the scattered material being only to split light while not providing an illuminated feature or having the additional silicated property of the oil.

The present invention is further capable of injecting a transparent oil (not disclosed in the drawings) after the filling up of the illuminated or silicated inorganic particles 2 into the opening 11, in order to fill up the space between the particles, then fixing the transparent cap 6 while achieving the effectiveness of increasing the apparent strength and illuminated area of the light.

In the preferred embodiment of the present invention, illuminated or silicated inorganic particles are utilized to increase the distribution or diffusion of light while eliminating or reducing surface interfaces by filling the empty spaces with a transparent oil to further obtain a strong light scattering without any apparent black lines in the illuminating device.

In summary, the present invention is an improvement over the common illuminating device that uses a light transmission fiber front end as an illuminating surface. The present invention can increase the apparent strength of light, the illuminating area and the scattering angle of light in a practical manner. The structure utilized in the present invention provides a modernized appearance.

I claim:

1. An improved illuminating device comprising:
a source of directional light;
a transparent housing extending over the source of light and having an interior cavity; and
a plurality of optical particles fill the interior cavity to provide an aggregation of particles of the type selected from a group consisting of calcium, fluoride, barium fluoride and sulphuric zinc freely disposed in the interior cavity to provide a diffusion of light from the source of light through the transparent housing to provide a broader directional transmission of light.

2. The invention of claim 1 wherein the transparent housing has an exterior envelope of a multi-faceted configuration.

3. The invention of claim 1 wherein an exterior envelope of the transparent housing has a plurality of planar facets.

4. The invention of claim 1 wherein the particles are coated with oil.

5. The invention of claim 1 wherein the interior cavity with the optical particles is filled with oil.

6. The invention of claim 1 wherein the directional source of light is an optical fiber attached to the transparent housing.

7. The invention of claim 1 wherein the directional source of light is an optical fiber attached to a light member and a cap member is attached at one end of the fiber, the cap member being fixed to the transparent housing.

8. The invention of claim 11 further including a multi-colored plate member positioned between the optical fiber and the light member.

9. An improved illuminating device, comprising:
a light member;
a multi-colored light transmissive plate positioned across the light member;
a plurality of optical fibers positioned adjacent to the light transmissive plate to simultaneously receive different colored light;
a plurality of transparent housing members connected to the optical fibers, each housing member having an interior cavity,; and
a plurality of optical particles filling each of the interior cavities as a freely disposed aggregation whereby a diffusion of light of different colors can be realized in the transparent housing members.

10. The invention of claim 9 wherein the type of particles are selected from a group consisting of calcium fluoride, barium fluoride and sulphuric zinc.

11. The invention of claim 10 wherein the transparent housing has an exterior envelope of a multi-faceted configuration.

12. The invention of claim 11 wherein the particles are coated with oil.

13. The invention of claim 12 wherein a cap member is attached at one end of each fiber and each cap member is fixed to a transparent housing member.

14. An improved illuminating device for a fiber optic comprising:
a cap member attached at an end of the fiber optic;
a transparent housing having an interior cavity attached to the cap member so that the cavity is sealed with the fiber optic end communicating with the cavity; and
a plurality of calcium fluoride particles filling the interior cavity as a freely disposed aggregation.

15. The invention of claim 14 wherein an exterior envelope of the transparent housing has a plurality of planar facets.

16. The invention of claim 14 wherein the calcium fluoride particles are coated with oil.

17. The invention of claim 14 wherein the interior cavity with the calcium fluoride particles is filled with oil.

18. An improved illuminating device comprising:
an optical fiber providing a source of directional light
a transparent housing having an exterior envelope which has a plurality of planar facets, said housing having an interior cavity extending over and attached to said optical fiber; and a plurality of optical particles filling said interior cavity to provide an aggregation of particles freely disposed in said interior cavity to provide a diffusion of light from said fiber through said housing to provide a broader directional transmission of light.

* * * * *